June 2, 1931.  G. K. V. JOHANSON  1,807,692
APPARATUS FOR AUTOMATICALLY ESTABLISHING A
PULSATING MOTION OF AIR IN TWO CONDUITS
Filed July 6, 1928

Georg Karl Vilhelm Johanson
INVENTOR.

By: Marks & Clerk
Attys.

Patented June 2, 1931

1,807,692

UNITED STATES PATENT OFFICE

GEORG KARL VILHELM JOHANSON, OF LIDINGO, SWEDEN, ASSIGNOR TO SVENSKA AKTIEBOLAGET GASACCUMULATOR, OF LIDINGO, SWEDEN

APPARATUS FOR AUTOMATICALLY ESTABLISHING A PULSATING MOTION OF AIR IN TWO CONDUITS

Application filed July 6, 1928, Serial No. 290,859, and in Sweden July 18, 1927.

This invention relates to apparatus for automatically establishing a pulsating motion of air in two conduits, in which each of said conduits is connected with a vacuum conduit and an atmospheric conduit by means of two valves, controlled by diaphragms, the arrangement being such that one of the valves is closed, when the other valve is open. The two valves may be formed in one piece so as to establish a double seated valve, controlled by one and the same diaphragm.

The apparatus may be applied to milking machines, but I do not confine my claims thereto, as I wish to protect my invention however used.

Figure 1:
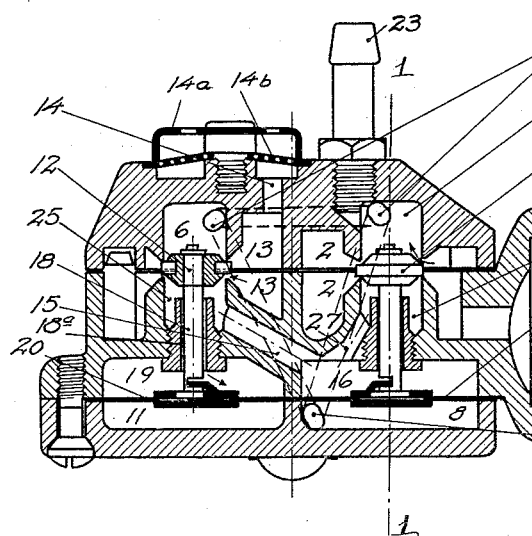
Figure 1 shows a vertical longitudinal section of the apparatus.
Figure 2:
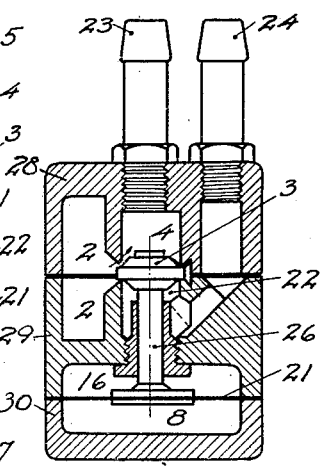
Figure 2 shows a vertical transverse section on the line 1—1 in Figure 1.

In carrying the invention into effect, 23 and 24 indicate the two conduits, in which a pulsating motion of air alternately is to be established. A chamber 2 formed in the casing of the apparatus made in three parts 28, 29, 30, is connected with a vacuum conduit (not shown) coupled to the pipe connection 1, and a second chamber 13 is connected with an atmospheric conduit, or mouths in the open air through an opening 14, which may be covered by a perforated cup 14ª containing an air filter 14ᵇ. Thus the chambers 2 and 13 always are under a vacuum and atmospheric pressure respectively. The conduits 23 and 24 are in communication with the chambers 4 and 22 respectively, between which a double valve 3 is situated in such a manner that one of the chambers 4 or 22 is out of communication with the vacuum chamber 2, when the other chamber 22 or 4 is in communication with the same. By means of devices, described below, the arrangement is such that atmospheric pressure prevails in each of the chambers 4 and 22, when said chamber is out of communication with the vacuum chamber 2, and thus it will be seen that alternately vacuum and atmospheric pressure prevails in these chambers.

Figure 3:
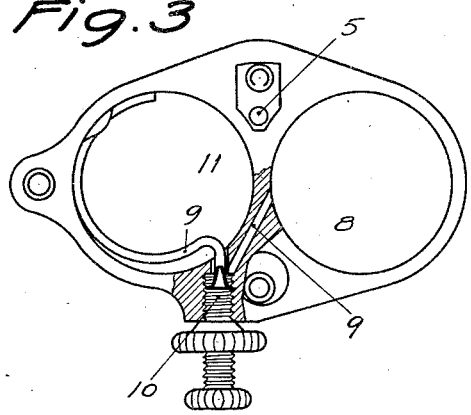
Figure 3 shows a plan, partly in section, of the lower part of the apparatus.

The double valve 3 is connected by means of its spindle 26 with a diaphragm 21, dividing a chamber in the apparatus into two compartments 16 and 8, of which the compartment 16 communicates with the chamber 22 by means of a channel 27 and with a chamber 25 by means of a channel 15. Said chamber 25 may be put into and out of communication with the atmospheric chamber 13 by the movement of a double valve 12, resembling the valve 3, above described, situated between the chamber 25 and an upper chamber 6, whereby said chamber 6 may be put into and out of communication with said atmospheric chamber 13 by the movements of the double valve 12. Said valve 12 is connected with a diaphragm 20 by means of its spindle 18, dividing a chamber in the apparatus into two compartments 19 and 11, of which 19 is in communication with the chamber 25 by means of a throttling, established by a suitable play 18ª around said valve spindle 18, whereas the compartment 11 is in communication with 8 through a channel 9, Figure 3, in which an adjustable throttling device 10 is inserted. The chambers 4, 6 and 8 are in communication with one another through a channel or pipe 5, 7.

The arrangement is such that when the valve 3 occupies its lower position, communication between the vacuum chamber 2 and the chamber 4 is established above the upper part of the valve 3, whereas communication between the chamber 22 and the vacuum chamber 2 is closed by the lower part of the valve. In the chamber 4 vacuum now prevails, and also in the chambers 6 and 8, owing to the channel connection 5, 7, whereby the diaphragm 21 maintains the valve 3 in its lower position. Thus in the conduit 23 vacuum now prevails. By means of the vacuum in the chamber 6, the valve 12 is pressed upwards opening communication between the atmospheric chamber 13 and the chamber 25 beneath the lower part of the valve, which atmospheric pressure is transferred to the chamber 16 through the channel 15 and from said chamber 16 and through the channel 27 to the chamber 22, which is in communication with the conduit 24, so that atmospheric pressure now prevails in said pipe 24.

Through the play 18ᵃ around the spindle 18, the atmospheric pressure in the chamber 25 is propagated as through a throttling device to the chamber 19, whereas simultaneously by means of the throttling device 10 vacuum is propagated from the chamber 8 to the chamber 11. Hereby the double valve 12 is reversed by the combined action of the atmospheric pressure in the chamber 19 and the vacuum in the chamber 11, closing the communication between the chamber 25 and the atmospheric chamber 13, whereas simultaneously communication between said chamber 13 and the chamber 6 is established above the upper part of the valve 12. The atmospheric pressure in the chamber 6 is propagated through the channel 5, 7 to the chambers 4 and 8, whereby atmospheric pressure will prevail on both sides of the diaphragm 21. The vacuum in the chamber 4 hereby effects a small lifting motion of the valve 3. so that vacuum will prevail in the chambers 22, 16, 25 and after some time also in the chamber 19. Atmospheric pressure hereby will prevail in the conduit 23 and vacuum in the conduit 24.

The atmospheric pressure in the chamber 8 is propagated over the throttling device 10 after some time to the chamber 11, so that the valve 12 is reversed closing the chamber 6 from the atmospheric chamber 13 and opening communication between said latter chamber 13 and the chambers 25, 16 and 22 simultaneously. As now atmospheric pressure again prevails on both sides of the diaphragm 21, the vacuum in the chamber 2 causes the valve 3 to move downwards, so that said chamber 2 is put in connection with the chambers 4, 6 and 8. Thereafter the operation is repeated.

The periods of vacuum and atmospheric pressure in the chamber 11, determine the periods of vacuum and atmospheric pressure in the conduits 23, 24 and may be adjusted by the throttling device 10.

However the originally determined play 18ᵃ around the spindle 18 may be augmented owing to wear of the spindle, so that the leakage to the chamber 19 may be so heavy, that the vacuum in said chamber will be able to open the valve 12, in spite of the atmospheric counter pressure on the valve 12. According to the invention therefore the areas of the valve 12 are proportioned in relation to the areas of the diaphragm 20, so that the maximum of vacuum in the chamber 19 will not be able to overcome the action of the pressures on the valve 12 before a sufficient atmospheric pressure is introduced in the chamber 11 through the throttling device 10. Or, at the movement of the valve 12 in opposite direction, that the maximum atmospheric pressure in the chamber 19 will not be able to overcome the action of the pressure on the valve 12 before sufficient vacuum is transmitted from the chamber 8 to the chamber 11 over the throttling device 10. The adjustment of said throttling device 10 therefore will alone determine the periods of vacuum and pressure in the conduits 23, 24.

Having now described my invention, what I claim as new and desire to secure by Letters Patent is:—

1. In an apparatus for establishing a pulsating motion of air in two conduits, means for automatically and alternatively connecting each of said conduits with a vacuum conduit and with an atmospheric conduit, double valves for controlling communication between each of said two conduits and each of said vacuum and atmospheric conduits, a diaphragm carrying one of said double valves, a second diaphragm carrying the other double valve, each diaphragm limiting a chamber, and a communciation between said chambers, and also between one of the said chambers and other chambers above the double valves, said latter chambers being in communication with one another, and an adjustable throttling device in the communication between the chambers limited by the diaphragms.

2. In an apparatus for establishing a pulsating motion of air in two conduits, a vacuum duct, a vibratory diaphragm, a two way valve between the vacuum duct and the two conduits and lying wholly on one side of said diaphragm and a valve spindle connecting said valve to this side of the diaphragm, an atmospheric duct, and a means adapted to put the atmospheric duct in communication with the two conduits alternatively.

3. In an apparatus for establishing a pulsating motion of air in two conduits, a vacuum duct, a vibratory diaphragm, a two-way valve between the vacuum duct and the two conduits and lying wholly on one side of said diaphragm and a valve spindle connecting said valve to this side of the diaphragm, an atmospheric duct, a second vibratory diaphragm, a second two-way valve between the atmospheric duct and the two conduits and lying wholly on one side of said diaphragm and a valve spindle connecting the second valve to this side of the second diaphragm.

4. Apparatus for establishing a pulsating motion of air in two conduits comprising a casing, two conduits in this casing, a vacuum duct connected to a vacuum chamber in the casing, a diaphragm limiting another chamber in the casing, a two-way valve between the vacuum chamber and the two conduits and lying wholly on one side of this diaphragm and a valve stem connecting this valve to the said side of the diaphragm, an atmospheric duct connected to an atmospheric chamber in the casing, a second diaphragm limiting another chamber in the casing, another two-way valve between the atmospheric chamber and the two conduits and lying wholly on one side of this second diaphragm and a valve stem connecting this valve to the said side on the second diaphragm.

5. Apparatus for establishing a pulsating motion of air in two conduits comprising a casing, two conduits in this casing, a vacuum duct connected to a vacuum chamber in the casing, a diaphragm limiting another chamber in the casing, a two way valve between the vacuum chamber and the two conduits and lying wholly on one side of this diaphragm and a valve stem connecting this valve to the said side of the diaphragm, an atmospheric duct connected to an atmospheric chamber in the casing, a second diaphragm limiting another chamber in the casing, another two-way valve between the atmospheric chamber and the two conduits and lying wholly on one side of this second diphragm and a valve stem connecting this valve to the said side on the second diaphragm, further chambers above the valves in free communication with each other and with one of the two conduits and with the chamber limited by the first diaphragm, and further chambers on the underside of said valves in free communication with each other and with the other of the two conduits and with the outer face of the first diaphragm.

6. Apparatus for establishing a pulsating motion of air in two conduits comprising a casing, two conduits in this casing, a vacuum duct connected to a vacuum chamber in the casing, a diaphragm limiting another chamber in the casing, a two way valve between the vacuum chamber and the two conduits and lying wholly on one side of this diaphragm and a valve stem connecting this valve to the said side of the diaphragm, an atmospheric duct connected to an atmospheric chamber in the casing, a second diaphragm limiting another chamber in the casing, another two-way valve between the atmospheric chamber and the two conduits and lying wholly on one side of this second diaphragm and a valve stem connecting this valve to the said side on the second diaphragm, further chambers above the valves in free communication with each other and with one of the two conduits and with the chamber limited by the first diaphragm, and further chambers on the underside of said valves in free communication with each other and with the other of the two conduits and with the outer face of the first diaphragm, an adjustable throttled communication between the chambers limited by the two diaphragms, and a throttled communication between the outer sides of said diaphragms connected to the valves.

7. In an apparatus for establishing a pulsating motion of air in two conduits, means for automatically and alternately connecting each of the said conduits with a vacuum conduit and with an atmospheric conduit, two-way valves for controlling communication between each of the said two conduits and each of the said vacuum and atmospheric conduits, a diaphragm carrying the first valve and a second diaphragm carrying the second valve, the valves being positioned on separate spindles each secured to one side only of its separate diaphragm, which sides lie in the same direction, each diaphragm limiting a chamber opposite to the side on which the said spindles are secured, and a communication between the said chambers and between one of them and other chambers above the one side of the double valves, the last mentioned chambers also communicating with one another through a channel.

In testimony whereof I have signed my name to this specification.

GEORG KARL VILHELM JOHANSON.